(12) United States Patent
Knutsen

(10) Patent No.: US 8,170,802 B2
(45) Date of Patent: May 1, 2012

(54) COMMUNICATION BETWEEN SENSOR UNITS AND A RECORDER

(75) Inventor: Thorleiv Knutsen, Asker (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/385,439

(22) Filed: Mar. 21, 2006

(65) Prior Publication Data

US 2007/0225944 A1    Sep. 27, 2007

(51) Int. Cl.
*G01V 1/28* (2006.01)
(52) U.S. Cl. .................................................. 702/14
(58) Field of Classification Search .................. 702/14, 702/17, 18, 188; 455/127, 522, 561, 574, 455/69; 370/351; 709/224
See application file for complete search history.

(56) References Cited

U.S. PATENT DOCUMENTS

| | | | |
|---|---|---|---|
| 3,886,494 A * | 5/1975 | Kostelnicek et al. ........... 367/77 |
| 3,990,036 A | 11/1976 | Savit | |
| 4,001,769 A | 1/1977 | Fort | |
| 4,072,923 A | 2/1978 | Siems | |
| 4,092,629 A | 5/1978 | Siems | |
| 4,117,448 A | 9/1978 | Siems | |
| 4,152,691 A | 5/1979 | Ward | |
| 4,725,992 A * | 2/1988 | McNatt et al. ................... 367/77 |
| 4,739,325 A | 4/1988 | MacLeod | |
| 4,815,044 A * | 3/1989 | Deconinck et al. ............. 367/77 |
| 4,905,205 A | 2/1990 | Rialan | |
| 5,592,438 A | 1/1997 | Rorden et al. | |
| 5,650,981 A | 7/1997 | Jacobsen et al. | |
| 5,822,273 A * | 10/1998 | Bary et al. ....................... 367/77 |
| 6,002,339 A * | 12/1999 | Norris ........................... 340/690 |
| 6,188,962 B1 * | 2/2001 | Morgan et al. .................. 702/14 |
| 6,191,587 B1 * | 2/2001 | Fox ................................. 324/350 |
| 6,484,100 B1 | 11/2002 | Zuurbier et al. | |
| 6,532,190 B2 | 3/2003 | Bachrach | |
| 6,553,336 B1 * | 4/2003 | Johnson et al. ............... 702/188 |
| 6,560,565 B2 * | 5/2003 | Roy et al. ....................... 702/188 |
| 6,671,222 B2 | 12/2003 | Wilson et al. | |
| 6,735,630 B1 * | 5/2004 | Gelvin et al. .................. 709/224 |
| 6,832,251 B1 * | 12/2004 | Gelvin et al. .................. 709/224 |
| 6,859,831 B1 * | 2/2005 | Gelvin et al. .................. 709/224 |
| 6,915,216 B2 * | 7/2005 | Troxler et al. ................... 702/33 |
| 6,934,219 B2 * | 8/2005 | Burkholder et al. ............ 367/55 |
| 6,940,807 B1 * | 9/2005 | Rezvani et al. ................ 370/210 |
| 7,124,028 B2 * | 10/2006 | Ray et al. ........................... 702/1 |
| 2002/0193947 A1 | 12/2002 | Chamberlain | |
| 2003/0010493 A1 | 1/2003 | Hill et al. | |
| 2003/0128627 A1 | 7/2003 | Iseli | |
| 2003/0202424 A1 * | 10/2003 | Burkholder et al. ............ 367/42 |
| 2003/0218936 A1 | 11/2003 | Chamberlain | |
| 2004/0028023 A1 * | 2/2004 | Mandhyan et al. ........... 370/351 |
| 2004/0121786 A1 * | 6/2004 | Radcliffe et al. ............. 455/500 |
| 2004/0252585 A1 * | 12/2004 | Smith et al. ..................... 367/66 |
| 2005/0078672 A1 * | 4/2005 | Caliskan et al. .............. 370/389 |
| 2005/0114033 A1 | 5/2005 | Ray et al. | |
| 2005/0259514 A1 * | 11/2005 | Iseli et al. ........................ 367/79 |
| 2006/0019695 A1 * | 1/2006 | Miyazaki et al. ............. 455/522 |
| 2006/0083109 A1 * | 4/2006 | Kimura et al. .................. 367/38 |

FOREIGN PATENT DOCUMENTS

| | | |
|---|---|---|
| WO | 03 090411 A1 | 10/2003 |
| WO | 2006021877 A2 | 3/2006 |

OTHER PUBLICATIONS

CIPO Office Action dated Jan. 19, 2011 and CIPO Office Action dated Aug. 6, 2009; from CA 2,580,200 (Canadian counterpart to U.S. Appl. No. 11/385,439).

(Continued)

*Primary Examiner* — Mohamed Charioui

(57) ABSTRACT

A seismic acquisition system. In one implementation, the seismic acquisition system includes a recorder having a memory having a communication protocol application stored therein and one or more sensor units in communication with the recorder through a communications network. Each sensor unit may include a memory having the communication protocol application stored therein.

10 Claims, 2 Drawing Sheets

OTHER PUBLICATIONS

RUPTO Office Action/Translation dated Jun. 2010, RUPTO Office Action/Translation dated Dec. 2009, and RUPTO Office Action/Translation dated May 2009; from RU 2007110226 (Russian counterpart to U.S. Appl. No. 11/385,439).

SIPO Office Action/Translation dated Jun. 12, 2010 SIPO Office Action/Translation dated Feb. 24, 2010 and SIPO Office Action/Translation dated Sep. 18, 2009; from CN 200710087853.3 (Chinese counterpart to U.S. Appl. No. 11/385,439).

Associate Transmittal and IMPI Office Action dated Mar. 18, 2010 Associate Transmittal and IMPI Office Action dated Oct. 23, 2009 and Associate Transmittal dated Aug. 18, 2009 concerning IMPI Office Action; from MX/a/2007/003340 (Mexican counterpart to U.S. Appl. No. 11/385,439).

* cited by examiner

COMMUNICATION BETWEEN SENSOR UNITS AND A RECORDER

BACKGROUND

1. Field of the Invention

Implementations of various technologies described herein generally relate to seismic acquisition.

1. Description of the Related Art

The following descriptions and examples are not admitted to be prior art by virtue of their inclusion within this section.

A seismic survey typically includes an acquisition system consisting of a plurality of seismic sources that exert energy on the earth, a recorder and a plurality of sensor units configured to record signals containing the reflected energy exerted by the seismic sources, which may commonly be referred to as seismic data. Typically, the seismic data may be forwarded to the recorder through a set of transport network nodes that run applications configured to gather the seismic data from the sensor units by a polling technique and push the seismic data to the recorder.

SUMMARY

Described herein are implementations of various technologies for a seismic acquisition system. In one implementation, the seismic acquisition system includes a recorder having a memory having a communication protocol application stored therein and one or more sensor units in communication with the recorder through a communications network. Each sensor unit may include a memory having the communication protocol application stored therein.

Described herein are also implementations of various technologies for sending seismic data to a recorder by a sensor unit. In one implementation, the method includes sampling seismic data from a sensor of the sensor unit, sending the seismic data to the recorder using a communication protocol and receiving a signal acknowledging receipt of the seismic data by the recorder.

Described herein are also implementations of various technologies for a sensor unit for a seismic acquisition system. In one implementation, the sensor unit includes a sensor, a processor and a memory comprising program instructions executable by the processor to sample seismic data from the sensor and send the seismic data using a communication protocol.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

DETAILED DESCRIPTION

Figure 1:
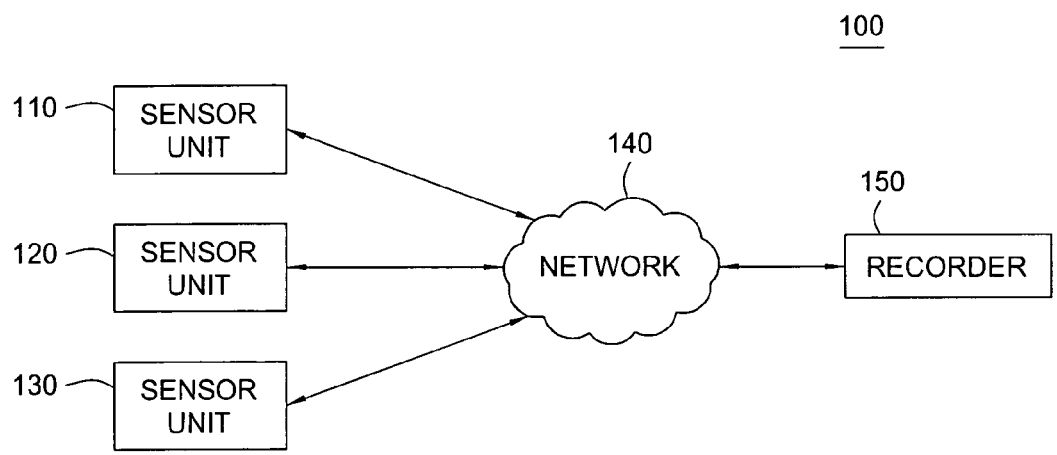
FIG. 1 illustrates a seismic acquisition system in accordance with implementations of various technologies described herein.

FIG. 1 illustrates a seismic acquisition system 100 in accordance with implementations of various technologies described herein. In one implementation, the seismic acquisition system 100 is used on land. However, it should be understood that in some implementations, the seismic acquisition system 100 may be used in other settings, such as a marine setting. The seismic acquisition system 100 may include sensor units 110, 120 and 130 in communication with a communications network 140. Although only three sensor units are shown, it should be understood that, in some implementations, more or less than three sensor units may be used in the seismic acquisition system 100. Each sensor unit will be described in more detail with reference to FIG. 2.

The seismic acquisition system 100 further includes a recorder 150 in communication with the communications network 140. In this manner, the sensor units may communicate with the recorder 150 through the communications network 140, which may be any type of communications network, including hardwired cables, wireless links, fiber optic, Ethernet network and the like. In one implementation, the communications network 140 provides each sensor unit with two or more communication paths to the recorder 150, which may be configured to receive seismic data and store them into records. The recorder 150 will be described in more detail in the paragraphs below with reference to FIG. 3.

Figure 2:
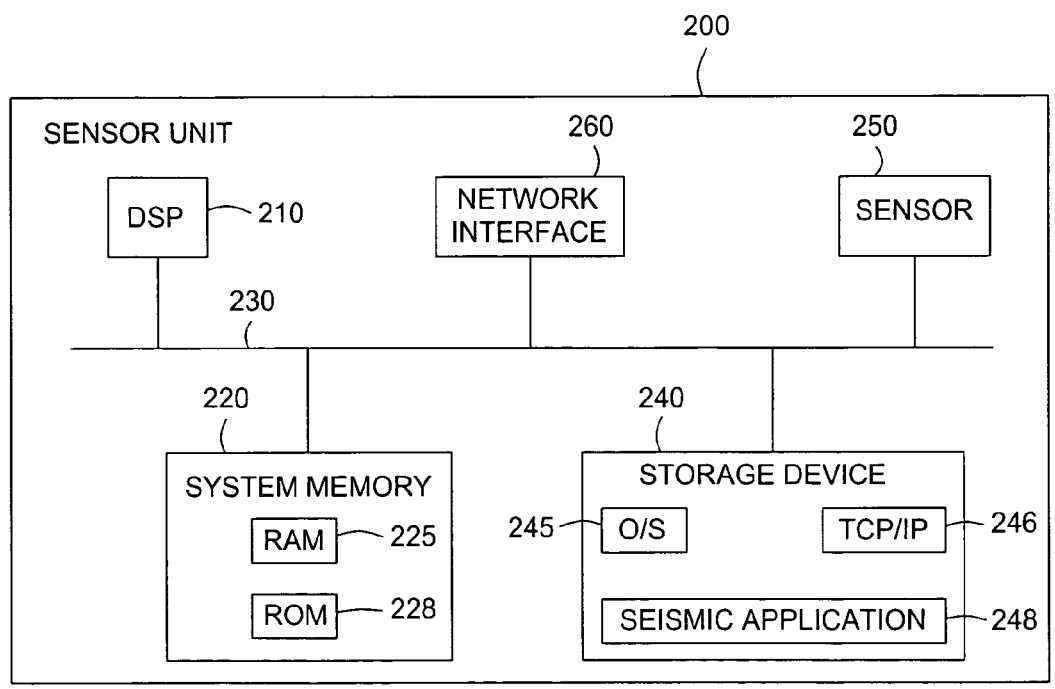
FIG. 2 illustrates a schematic diagram of a sensor unit in accordance with implementations of various technologies described herein.

FIG. 2 illustrates a schematic diagram of a sensor unit 200 in accordance with implementations of various technologies described herein. In one implementation, the sensor unit 200 may include a digital signal processor 210, a system memory 220, a system bus 230 that couples the digital signal processor 210 with the system memory 220. The system memory 220 may include a random access memory (RAM) 225 and a read-only memory (ROM) 228. The digital signal processor 210 may include a microprocessor. A basic input/output system containing the basic routines that help to transfer information between components within the computer, such as during startup, may be stored in the ROM 228.

The sensor unit 200 may further include a sensor 250, which is configured to detect seismic energy in the form of ground motion or a pressure wave in fluid and transform it to an electrical impulse. The sensor 250 may also be commonly referred to in the seismic acquisition industry as a receiver. In one implementation, the sensor 250 may be an accelerometer, which may be configured to measure the acceleration of a ship or aircraft, or to detect ground acceleration in boreholes or on the earth's surface produced by acoustic vibrations. Those skilled in the art will appreciate that various types of sensors may be practiced in implementations of various technologies described herein. Further, although the sensor unit 200 is described as having one sensor, it should be understood that, in some implementations, the sensor unit 200 may have more than one sensor.

The sensor unit 200 may further include a storage device 240 for storing an operating system 245, a Transmission Control Protocol/Internet Protocol (TCP/IP) protocol application 246, a seismic acquisition application 248 and other program modules executable by the digital signal processor 210. The operating system 245 may be configured to control the operation of the sensor unit 200. The operating system 245 may be Windows® XP, Mac OS® X, Unix-variants, like Linux® and BSD®, and the like.

The TCP/IP protocol application 245 may be defined as a layered software architecture that allows the sensor units to communicate with the recorder 150 across the communications network 140. TCP/IP protocol may also be commonly known as the basic communication language or protocol of the Internet. As such, the sensor units may use the TCP/IP protocol application 245 to transfer seismic data to the recorder 150. Although the above referenced implementations are described with reference to a TCP/IP protocol, it should be understood that some implementations may use other types of communication protocols, such as connection-oriented end-to-end protocols, Open Systems Interconnection (OSI), asynchronous transfer mode (ATM) and the like.

The seismic acquisition application 248 may be configured to sample seismic data from the sensor 250 and send the seismic data to the recorder 150 using the TCP/IP protocol application 246. The manner in which seismic data are transferred between the sensor units and the recorder will be described in more detail in the following paragraphs with reference to FIG. 4.

The storage device 240 may be connected to the digital signal processor 210 through the system bus 230 and a mass storage controller (not shown). The storage device 240 and its associated computer-readable media may be configured to provide non-volatile storage for the sensor unit 200. Those skilled in the art will appreciate that computer-readable media may refer to any available media that can be accessed by the sensor unit 200. For example, computer-readable media may include computer storage media and communication media. Computer storage media includes volatile and non-volatile, and removable and non-removable media implemented in any method or technology for storage of information such as computer-readable instructions, data structures, program modules or other data. Computer storage media further includes, but is not limited to, RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the sensor unit 200.

The sensor unit 200 may connect to the communications network 140 through a network interface unit 260 connected to the system bus 230. It should be appreciated that the network interface unit 260 may also be used to connect to other types of networks and remote computer systems.

Figure 3:
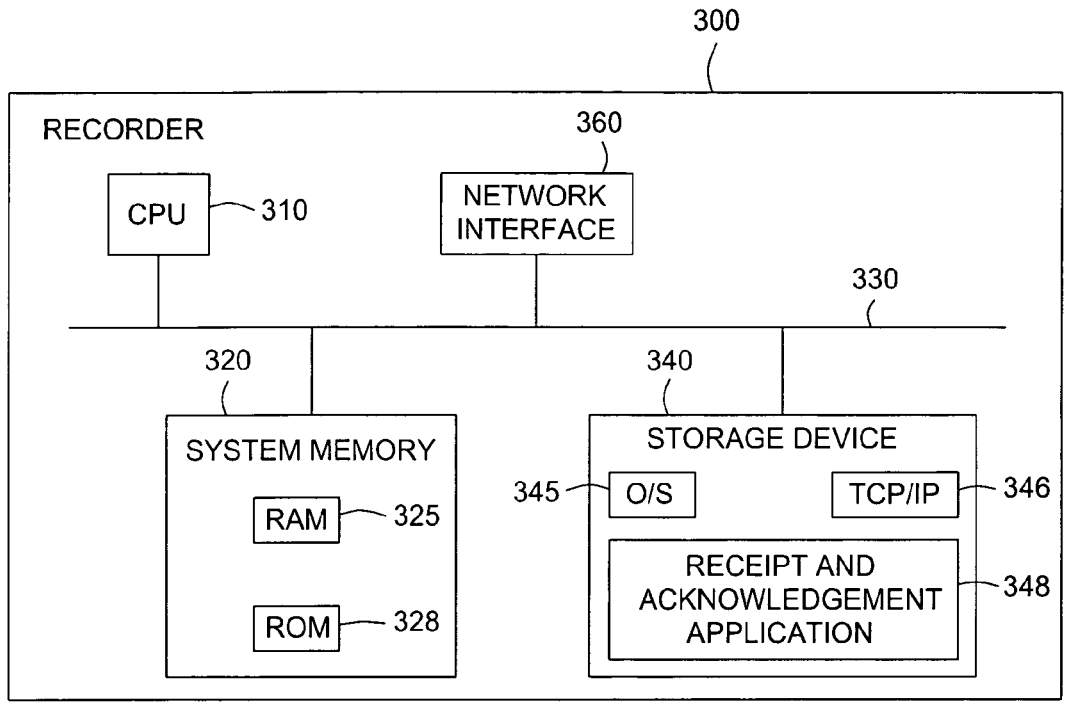
FIG. 3 illustrates a schematic diagram of a recorder in accordance with implementations of various technologies described herein.

FIG. 3 illustrates a schematic diagram of a recorder 300 in accordance with implementations of various technologies described herein. In one implementation, the recorder 300 may include a CPU 310, a system memory 320, a storage device 340, a system bus 330 that couples the CPU 310 with the system memory 320 and the storage device 340. The CPU 310 may be configured to process various program modules stored inside the storage device 340, some of which will be discussed in more detail in the following paragraphs.

The system memory 320 may include a random access memory (RAM) 325 and a read-only memory (ROM) 328. A basic input/output system containing the basic routines that help to transfer information between components within the computer, such as during startup, may be stored in the ROM 328.

The storage device 340 may include an operating system 345, a TCP/IP protocol application 346, a receipt and acknowledgement application 348 and other program modules executable by the CPU 310. The operating system 345 may be configured to control the operation of the recorder 300. The operating system 345 may be Windows® XP, Mac OS® X, Unix-variants, like Linux® and BSD®), and the like. The TCP/IP protocol application 346 may enable the recorder 300 to communicate with the sensor unit 200 through the communications network 140. As mentioned above, it should be understood that in some implementations other communication protocols, such as ATM, OSI and the like, may be used to facilitate communications between the sensor unit 200 and the recorder 300. The receipt-and -acknowledgement application 348 may be configured to receive seismic data from the sensor unit 200 and send an acknowledgement signal back to the sensor unit 200 using the TCP/IP protocol application 346.

The storage device 340 and its associated computer-readable media may be configured to provide non-volatile storage for the recorder 300. Those skilled in the art will appreciate that computer-readable media may refer to any available media that can be accessed by the recorder 300. For example, computer-readable media may include computer storage media and communication media. Computer storage media includes volatile and non-volatile, and removable and non-removable media implemented in any method or technology for storage of information such as computer-readable instructions, data structures, program modules or other data. Computer storage media further includes, but is not limited to, RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the recorder 300.

The recorder 300 may connect to the communications network 140 through a network interface unit 360 connected to the system bus 330. It should be appreciated that the network interface unit 360 may also be used to connect to other types of networks and remote computer systems.

Figure 4:
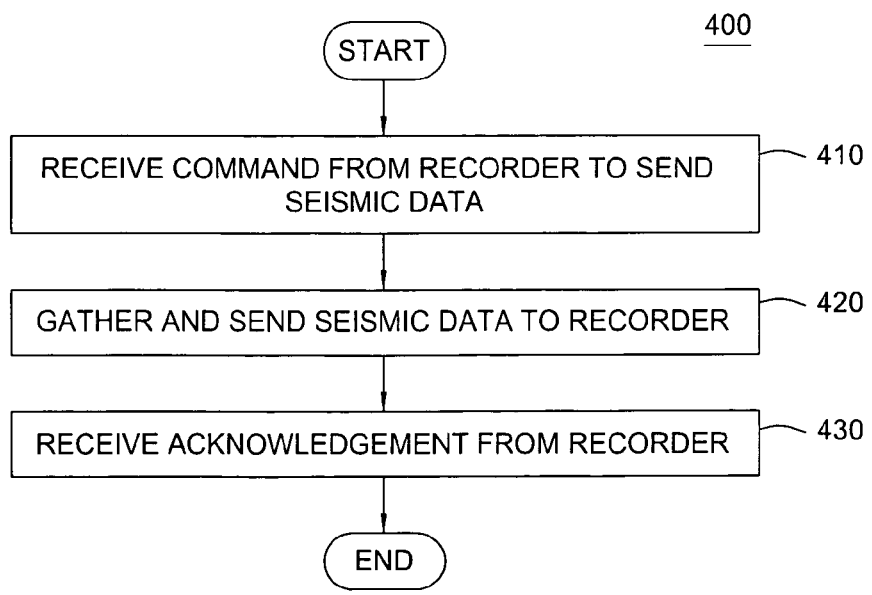
FIG. 4 illustrates a flow diagram of a method for sending seismic data in accordance with various technologies described herein.

FIG. 4 illustrates a flow diagram of a method 400 for sending seismic data to a recorder in accordance with various technologies described herein. At step 410, a command for sending seismic data to an IP address is received by the sensor unit 200. In one implementation, the IP address is the IP address of the recorder 300. In response to receiving the command from the recorder 300, the sensor unit 200 samples the seismic data and sends the seismic data through the communications network 140 using the TCP/IP protocol application 246 to the recorder 300 (step 420). In one implementation, the sensor unit 200 performs step 420 without having to receive the request command from the recorder 300. In another implementation, the seismic data may be sent to the recorder 300 using another communication protocol, such as OSI and the like. At step 430, an acknowledgement signal from the recorder 300 is received by the sensor unit 200. The sensor unit 200 may continue to sample and send seismic data to the recorder 300 until the seismic acquisition process is completed.

In one implementation, if no acknowledgement signal from the recorder is received, then the sensor unit 200 may resend the seismic data through a different path in the communications network 140. In this manner, the sensor unit 200 may simply resend a package of seismic data through a different path in the event that the package of seismic data is lost during the earlier transmission, without having to analyze whether the communication breakdown occurred between the sensor unit 200 and the communications network 140 or between the communications network 140 and the recorder 300.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for sending seismic data during a seismic survey, comprising:
   providing a communications network having a first communication path and a second communication path to a seismic recorder, wherein the second communication path is different from the first communication path;
   sampling seismic data acquired during a land seismic survey;
   sending the seismic data to the seismic recorder using a communications protocol application via the first communication path;
   receiving an acknowledgement signal from the seismic recorder to indicate that the seismic recorder received the seismic data; and
   sending the seismic data again to the seismic recorder via the second communication path if the acknowledgement signal has not been received.

2. The method of claim 1, wherein the communications protocol application is a Transmission Control Protocol/Internet Protocol (TCP/IP).

3. The method of claim 1, further comprising receiving a command to send the seismic data to an IP address of the seismic recorder.

4. The method of claim 1, wherein the land seismic survey comprises a plurality of seismic sources that exert energy on the earth, the seismic recorder, and the sensors configured to detect reflected seismic energy exerted by the seismic sources.

5. The method of claim 1, wherein the seismic data is sent again to the seismic recorder via the second communication path without analyzing the communications network.

6. A method for sending seismic data during a seismic survey, comprising:
   providing a communications network having a first communication path and a second communication path to a seismic recorder, wherein the second communication path is different from the first communication path;
   sampling seismic data acquired during a marine seismic survey;
   sending the seismic data to the seismic recorder using a communications protocol application via the first communication path;
   receiving an acknowledgement signal from the seismic recorder to indicate that the seismic recorder received the seismic data; and
   sending the seismic data again to the seismic recorder via the second communication path if the acknowledgement signal has not been received.

7. The method of claim 6, wherein the communications protocol application is a Transmission Control Protocol/Internet Protocol (TCP/IP).

8. The method of claim 6, further comprising receiving a command to send the seismic data to an IP address of the seismic recorder.

9. The method of claim 6, wherein the marine seismic survey comprises a plurality of seismic sources that exert energy on the earth, the seismic recorder, and the sensors configured to detect reflected seismic energy exerted by the seismic sources.

10. The method of claim 6, wherein the seismic data is sent again to the seismic recorder via the second communication path without analyzing the communications network.

* * * * *